(12) United States Patent
Khandelwal et al.

(10) Patent No.: US 6,748,508 B1
(45) Date of Patent: Jun. 8, 2004

(54) METHOD AND APPARATUS FOR BUFFERING IN MULTI-NODE, DATA DISTRIBUTION ARCHITECTURES

(75) Inventors: Vivek Khandelwal, Sunnyvale, CA (US); James G. Hanko, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 564 days.

(21) Appl. No.: 09/691,477

(22) Filed: Oct. 17, 2000

(51) Int. Cl.$^7$ ............................................. G06F 12/00
(52) U.S. Cl. ..................... 711/170; 711/150; 711/152; 711/163; 711/171; 709/203; 709/219; 709/225; 709/226; 709/231; 709/238; 710/52; 710/56; 710/57; 710/200; 710/220; 725/87; 725/92; 725/93; 725/94
(58) Field of Search ................................. 709/203, 219, 709/225, 226, 231, 236; 710/52, 56, 57, 200, 220; 711/150, 152, 163, 170, 171; 725/87, 92, 93, 94

(56) References Cited

U.S. PATENT DOCUMENTS 5,832,484 A * 11/1998 Sankaran et al. ............... 707/8
5,838,994 A * 11/1998 Valizadeh ..................... 710/56

OTHER PUBLICATIONS

Jerry Golick, Networking Computing in the New Thin–Client Age—Mar. 1999, ACM Press, vol. 3—Issue 1, pp 30–40.*

* cited by examiner

*Primary Examiner*—Donald Sparks
*Assistant Examiner*—Bao Q. Truong
(74) *Attorney, Agent, or Firm*—O'Melveny & Myers LLP

(57) ABSTRACT

The present invention provides a method and apparatus for buffering in multi-node data distribution architectures. One embodiment of the present invention groups data items into frames and stores the frames in a buffer. One embodiment allocates storage space for the buffer such that enough storage is available to accommodate one frame for every client wishing access to the data in addition to a fixed number of frames. One embodiment stores the buffer as a linked list of frames. In one embodiment, the head of the linked list is the oldest frame in the buffer and the tail of the linked list is the newest frame. When a new frame of data is added to a full buffer, the oldest frame not in use is removed and the new frame is added. One embodiment, allows multiple clients to access a single frame in the buffer simultaneously. The clients indicate when they are using a frame in the buffer so that the frame is not overwritten. In one embodiment, a client locks a frame only when the frame is being dispatched to the client. In one embodiment, a client initially operates on the newest frame. When a client finishes with one frame, it selects the next frame in the buffer's linked list. One embodiment is used in a video conferencing application. Frames consist of video or audio data packets. One embodiment is used in a thin client topology. Clients lock frames to set destination specific parameters as the frame is dispatched.

39 Claims, 17 Drawing Sheets

Figure 2: Dispatching Data From a Ring Buffer

Prior Art

Figure 3: Dispatching Data From a Ring Buffer

Prior Art

Figure 4: Centralized Data Distribution

Figure 5: Storing Data in a Buffer

Figure 6: Removing a Frame From the Buffer

Figure 7: Allocating Storage Space

Figure 8: Adding New Frame to the Buffer

Figure 9: Data Retrieval From the Buffer

Figure 10: Data Retrieval

Figure 11: Frame Selection For Retrieval

Figure 14: HID

Figure 15: HID Single Chip Implementation

Figure 16: Video Conferencing in a Thin Client Topology

METHOD AND APPARATUS FOR BUFFERING IN MULTI-NODE, DATA DISTRIBUTION ARCHITECTURES

BACKGROUND OF THE INVENTION

1. Field of the Invention

The present invention relates to the field of electronic communications, and in particular to a method and apparatus for buffering in multi-node data distribution architectures.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

When computing in a network, it is often the case that data is sent from one network location to another. Current computer schemes, however, are inadequate, specifically in situations where the data is being generated in real-time. Before further discussing the drawbacks of current prior art schemes, an application architecture where this problem typically occurs is described below.

Multi-tier Application Architecture

In the multi-tier application architecture, a client communicates requests to a server for data, software and services, for example, and the server responds to the requests. The server's response may entail communication with a database management system for the storage and retrieval of data.

The multi-tier architecture includes at least a database tier that includes a database server, an application tier that includes an application server and application logic (i.e., software application programs, functions, etc.), and a client tier. The data base server responds to application requests received from the client. The application server forwards data requests to the database server.

FIG. 1 provides an overview of a multi-tier architecture. Client tier 100 typically consists of a computer system that provides a graphic user interface (GUI) generated by a client 110, such as a browser or other user interface application. Conventional browsers include Internet Explorer and Netscape Navigator, among others. Client 110 generates a display from, for example, a specification of GUI elements (e.g., a file containing input, form, and text elements defined using the Hypertext Markup Language (HTML)) and/or from an applet (i.e., a program such as a program written using the Java™ programming language, or other platform independent programming language, that runs when it is loaded by the browser).

Further application functionality is provided by application logic managed by application server 120 in application tier 130. The apportionment of application functionality between client tier 100 and application tier 130 is dependent upon whether a "thin client" or "thick client" topology is desired. In a thin client topology, the client tier (i.e., the end user's computer) is used primarily to display output and obtain input, while the computing takes place in other tiers. A thick client topology, on the other hand, uses a more conventional general purpose computer having processing, memory, and data storage abilities. Database tier 140 contains the data that is accessed by the application logic in application tier 130. Database server 150 manages the data, its structure and the operations that can be performed on the data and/or its structure.

Application server 120 can include applications such as a corporation's scheduling, accounting, personnel and payroll applications, for example. Application server 120 manages requests for the applications that are stored therein. Application server 120 can also manage the storage and dissemination of production versions of application logic. Database server 150 manages the database(s) that manage data for applications. Database server 150 responds to requests to access the scheduling, accounting, personnel and payroll applications data, for example.

Connection 160 is used to transmit data between client tier 100 and application tier 130, and may also be used to transfer the application logic to client tier 100. The client tier can communicate with the application tier via, for example, a Remote Method Invocator (RMI) application programming interface (API) available from Sun Microsystems™. The RMI API provides the ability to invoke methods, or software modules, that reside on another computer system. Parameters are packaged and unpackaged for transmittal to and from the client tier. Connection 170 between application server 120 and database server 150 represents the transmission of requests for data and the responses to such requests from applications that reside in application server 120.

Elements of the client tier, application tier and database tier (e.g., client 110, application server 120 and database server 150) may execute within a single computer. However, in a typical system, elements of the client tier, application tier and database tier may execute within separate computers interconnected over a network such as a LAN (local area network) or WAN (wide area network).

Data Distribution

Some applications in computer networks require the ability to distribute data collected at one point in the network to other points in the network. Video conferencing applications are examples of such applications. First, data is collected at one point of the computer network and one or more other points in the network request the data. The data is, then, distributed to the requesting points of the network. However, if the collection point does not have the computational ability to distribute the data throughout the network (e.g., thin client topologies), the above method is insufficient for distributing data.

Buffering

When the amount of data being distributed is larger than the amount of storage space in a distribution unit, the data is streamed through a buffer. Data is also streamed through a buffer when distribution is handled in real time. One example is a video conferencing application distributing live video data. The video data is collected at one point, streamed to a distribution unit, buffered and distributed to multiple points in the network.

A prior art method of buffering and dispatching data is to store incoming data in a ring buffer. In a ring buffer, data is stored in an ordered set of N storage locations. When a new data item is stored, it is placed in the storage location which is next in order. When the buffer reaches the end of the order, the order repeats with the first storage location. Thus, a data item is stored in the buffer until N more data items are stored in the buffer. The Nth data item overwrites the first data item.

FIG. 2 illustrates a prior art method of dispatching data buffered in a ring buffer. At step 200, the storage location of a data item is locked. This means the storage location can only be used by the client which locked it. At step 210, the storage location is copied to a different location. At step 220, the storage location is unlocked so other clients may use the data. At step 230, the copy of the data is processed by the client. At step 240, the processed copy of the data is dispatched to the desired location.

FIG. 3 illustrates another prior art method of dispatching data buffered in a ring buffer. At step 300, the storage location of a data item is locked. At step 310, the data item is processed by the client. At step 320, the processed data is dispatched to the desired location. At step 330, any changes to the data item are undone. At step 340, the storage location is unlocked so other clients may use the data.

With the methods of FIGS. 2 and 3, no incoming data is buffered if all the storage locations (buffers) are locked. If data is generated in real-time, this means that some data is lost. For example, if all buffers are locked in a video conferencing application, new video images are not stored until a buffer is unlocked. Thus, no client is able to view the new video images. Additionally, the method of FIG. 2 is inefficient with respect to storage space.

SUMMARY OF THE INVENTION

The present invention provides a method and apparatus for buffering in multi-node data distribution architectures. One embodiment of the present invention groups data items into frames and stores the frames in a buffer. One embodiment allocates storage space for the buffer such that enough storage is available to accommodate one frame for every client wishing access to the data in addition to a fixed number of frames.

One embodiment stores the buffer as a linked list of frames. In one embodiment, the head of the linked list is the oldest frame in the buffer and the tail of the linked list is the newest frame. When a new frame of data is added to a full buffer, the oldest frame not in use is removed and the new frame is added.

One embodiment, allows multiple clients to access a single frame in the buffer simultaneously. The clients indicate when they are using a frame in the buffer so that the frame is not overwritten while in use. In one embodiment, a client locks a frame only when the frame is being dispatched to the client. In one embodiment, a client initially operates on the newest frame. When a client finishes with one frame, it selects the next frame in the buffer's linked list.

One embodiment is used in a video conferencing application. Frames consist of video or audio data packets. One embodiment is used in a thin client topology. Clients lock frames to set destination specific parameters as the frame is dispatched.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for buffering in multi-node data distribution architectures. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Centralized Distribution

One embodiment of the present invention distributes data using a centralized distribution architecture. In a centralized distribution architecture, data is routed to a centralized location. The data is then sent from the centralized location to the points of the network which require the data.

Figure 1:
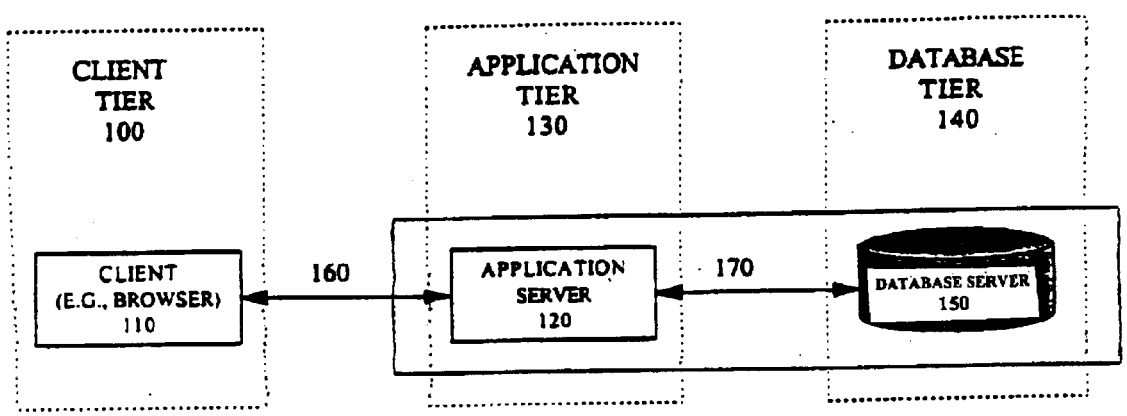
FIG. 1 is a block diagram of a multi-tier architecture.
Figure 2:
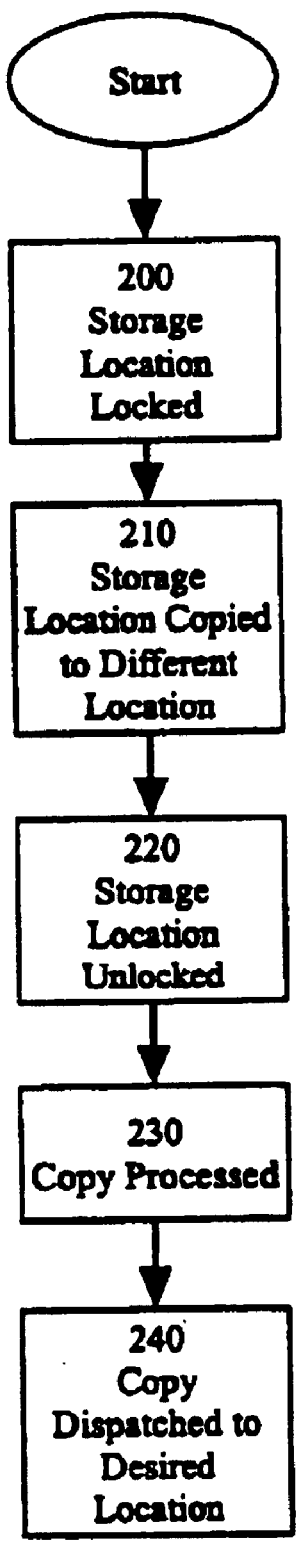
FIG. 2 is a flow diagram of a prior art method of dispatching data buffered in a ring buffer.
Figure 3:
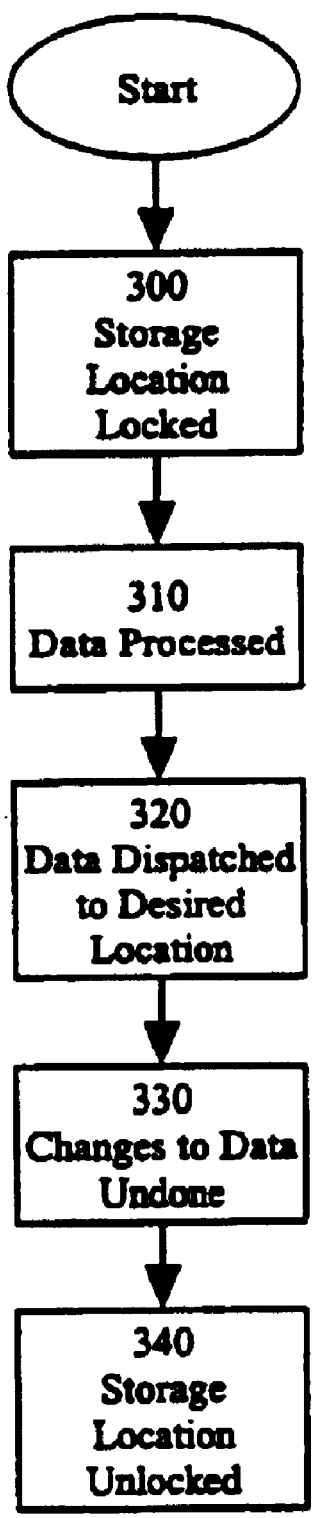
FIG. 3 is a flow diagram of a prior art method of dispatching data buffered in a ring buffer.
Figure 4:
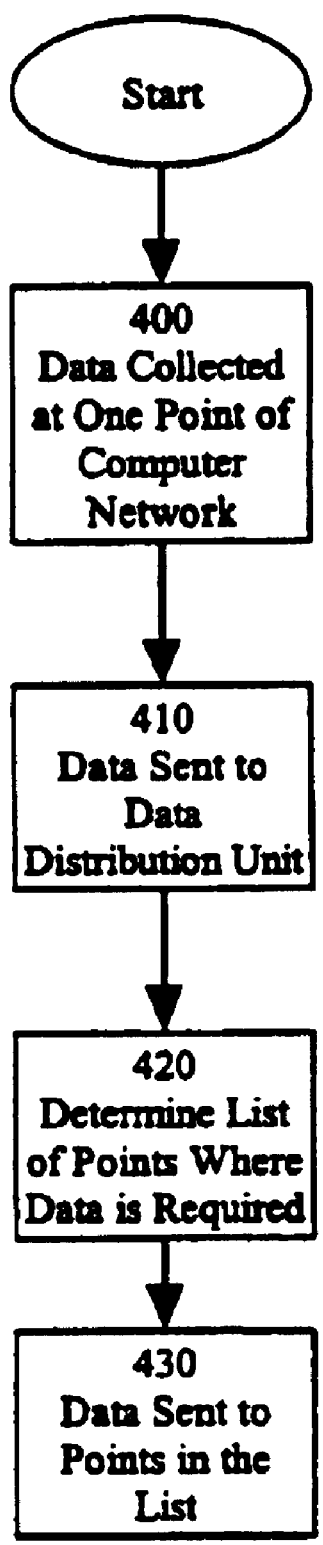
FIG. 4 is a flow diagram of a method of data distribution using a centralized distribution architecture in accordance with one embodiment of the present invention.

FIG. 4 illustrates a method of data distribution using a centralized distribution architecture in accordance with one embodiment of the present invention. At step 400, data is collected at one point of the computer network. At step 410, the data is sent to a data distribution unit. At step 420, a list is determined of points of the network at which the data is required. At step 430, the data is sent from the data distribution units to the points of the network in the list. The method of FIG. 4 enables the data to be distributed throughout the network even if the collection point does not have the computational ability to distribute the data (e.g., thin client topologies).

Buffering Data

One embodiment of the present invention groups data items into frames and stores the frames in a buffer. Frames are written to and released from the buffer as indivisible units. As data streams into the system, data items are divided into groups. For example, in a video conferencing application, associated packets of video data are grouped into individual frames for buffering. When space is needed for a new frame, an entire old frame's memory space is released and made available for use.

Figure 5:
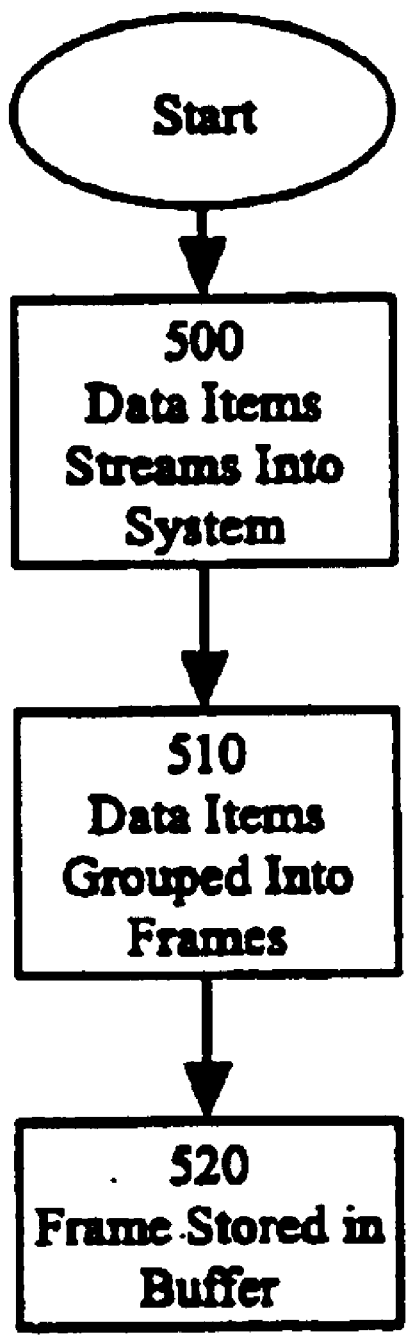
FIG. 5 is a flow diagram of a process of storing data in a buffer in accordance with one embodiment of the present invention.

FIG. 5 illustrates the process of storing data in a buffer in accordance with one embodiment of the present invention. At step 500, data items stream into the system. At step 510, the data items are grouped into frames. At step 520, the frame is stored in the buffer.

Figure 6:
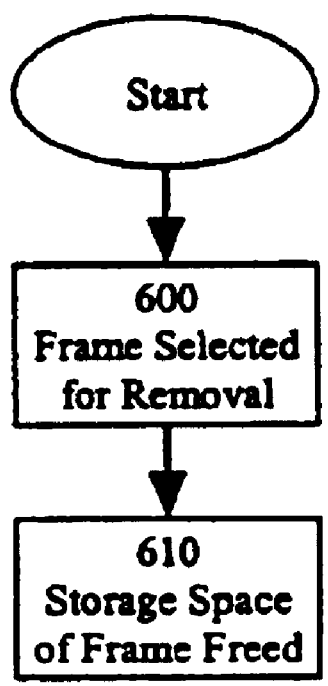
FIG. 6 is a flow diagram of a process of removing a frame from the buffer in accordance with one embodiment of the present invention.

FIG. 6 illustrates the process of removing a frame from the buffer in accordance with one embodiment of the present invention. At step 600, a frame is selected for removal. At step 610, the storage space of the frame is freed for further use.

One embodiment of the present invention allocates storage space for the buffer such that enough storage is available to accommodate one frame for every client wishing access to the data in addition to a fixed number of frames. Thus, a new frame can always be buffered if each client is limited to preventing only one frame from being removed from the buffer.

Figure 7:
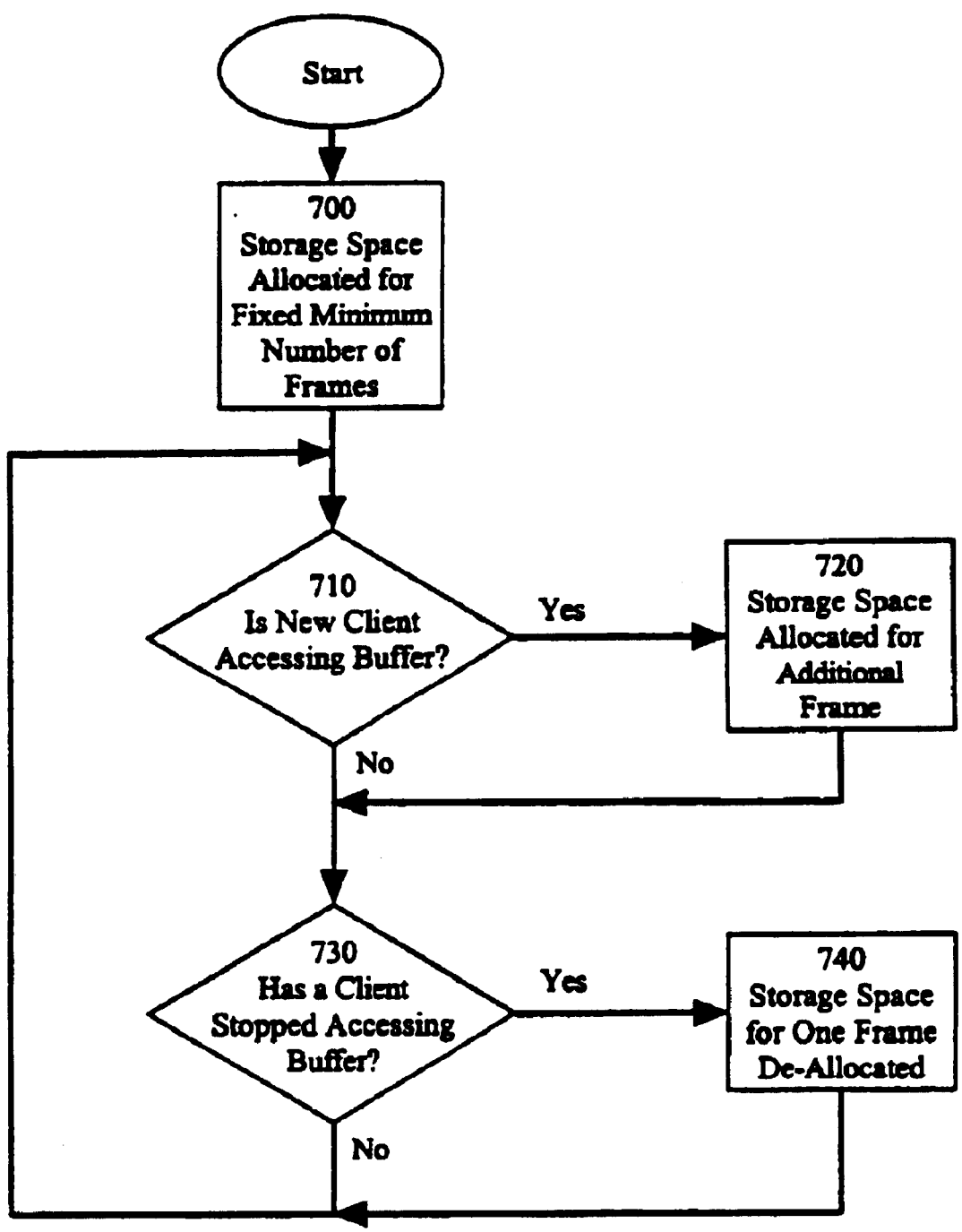
FIG. 7 is a flow diagram of a process of allocating storage space in accordance with one embodiment of the present invention.

FIG. 7 illustrates the process of allocating storage space in accordance with one embodiment of the present invention. At step 700, storage space is allocated for a fixed minimum number of frames. At step 710, it is determined whether a new client is accessing the buffer. If a new client is accessing the buffer, at step 720, storage space is allocated for an additional frame and the process continues at step 730. If no new client is accessing the buffer, the process continues at step 730.

At step 730, it is determined whether a client has stopped accessing the buffer. If a client has stopped accessing the buffer, at step 740, storage space for one frame is de-allocated and the process repeats at step 710. If no client has stopped accessing the buffer, the process repeats at step 710.

One embodiment stores the buffer as a linked list of frames. In one embodiment, the head of the linked list is the oldest frame in the buffer and the tail of the linked list is the newest frame. When a new frame of data is added to a full buffer, the oldest frame not in use is removed and the new frame is added.

Figure 8:
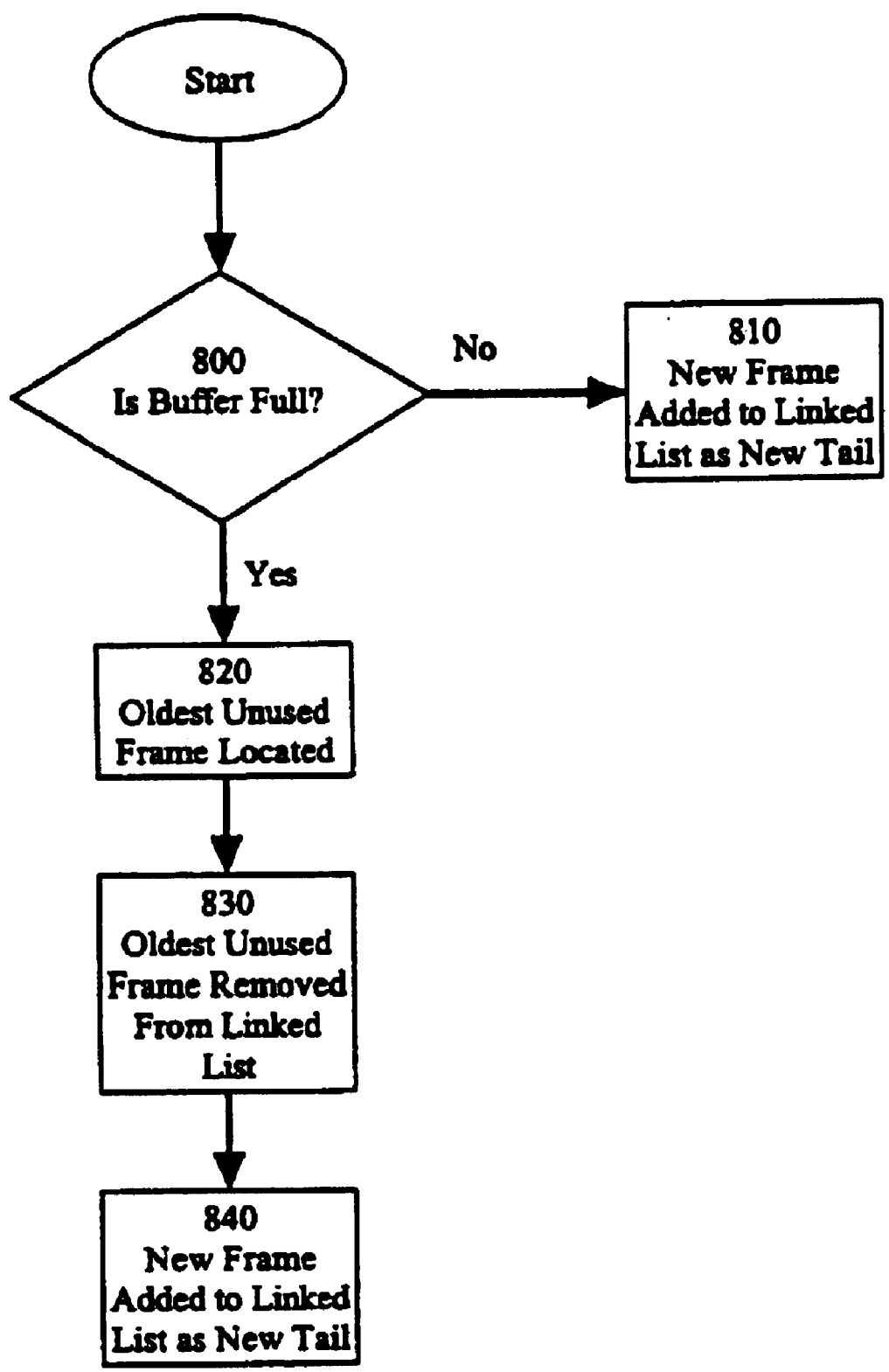
FIG. 8 is a flow diagram of a process of adding a new frame to the buffer in accordance with one embodiment of the present invention.

FIG. 8 illustrates the process of adding a new frame to the buffer in accordance with one embodiment of the present invention. At step 800, it is determined whether the buffer is full. If the buffer is not full, at step 810, the new frame is added to the linked list as the new tail. If the buffer is full, at step 820, the oldest unused frame is located. At step 830, the oldest unused frame is removed from the linked list. At step 840, the new frame is added to the linked list as the new tail.

Distributing Data

One embodiment distributes data by allowing clients to read data in the buffer. One embodiment, allows multiple clients to access a single frame in the buffer simultaneously. Each client indicates when it is using a frame in the buffer so that the frame is not overwritten while in use by the client.

Figure 9:
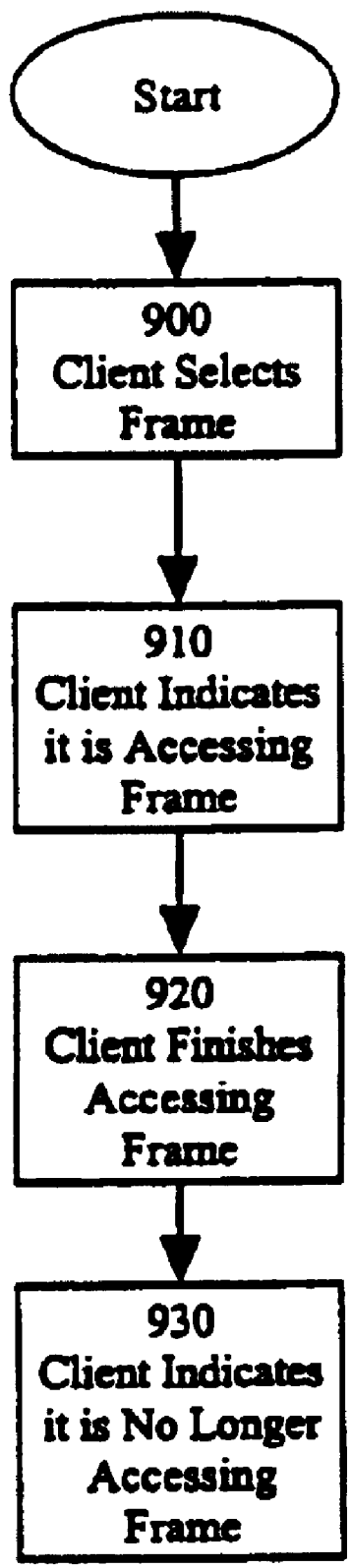
FIG. 9 is a flow diagram of a process a client uses to retrieve data from the buffer in accordance with one embodiment of the present invention.

FIG. 9 illustrates the process a client uses to retrieve data from the buffer in accordance with one embodiment of the present invention. At step 900, the client selects a frame to access. At step 910, the client indicates that it is accessing the frame. At step 920, the client finishes accessing the frame. At step 930, the client indicates that it is no longer accessing the frame and the process repeats at step 900.

In one embodiment, clients lock for exclusive use data items in a frame. A lock is a computer technique that allows multiple clients to access a single piece of data. When one client gains access to the data, it locks the data, forcing others to wait until the client is done with the data and unlocks it. This allows clients to operate on the frame, retrieve the frame, and then restore the frame to its original state without corrupting the data for other clients which wish access to it.

Figure 10:
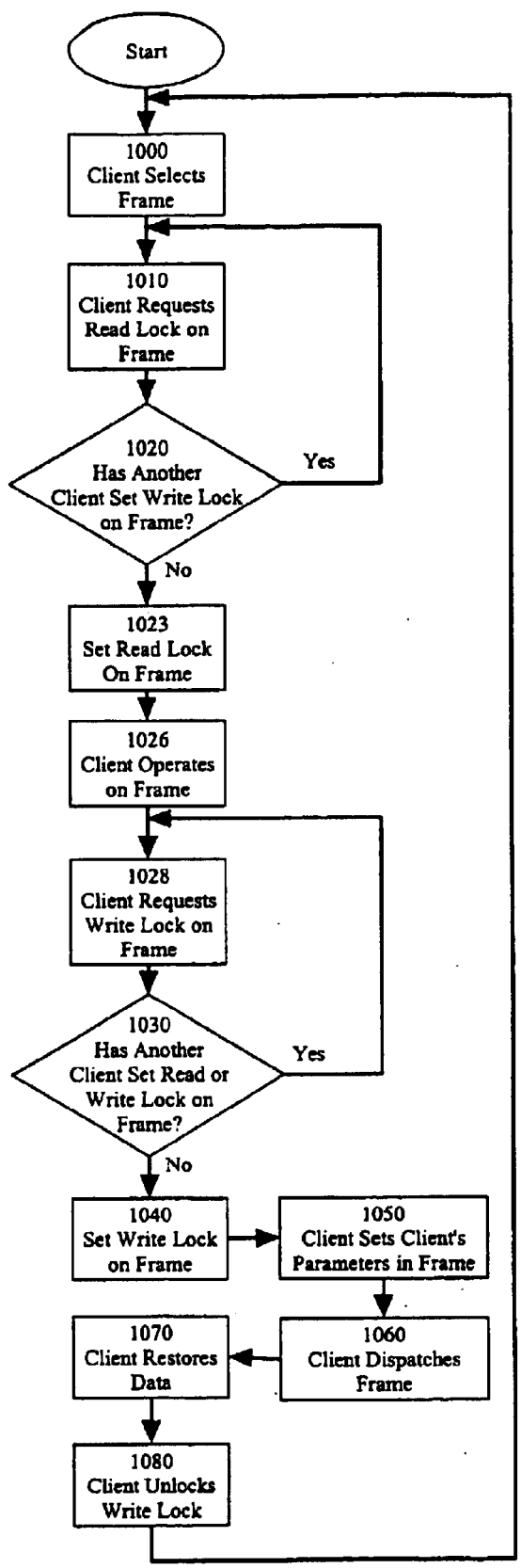
FIG. 10 is a flow diagram of a process of data retrieval in accordance with one embodiment of the present invention.

FIG. 10 illustrates the process of data retrieval in accordance with one embodiment of the present invention. At step 1000, the client selects a frame to dispatch. At step 1010, the client requests a read lock on the frame. At step 1020, it is determined whether another client has set the write lock on the frame. If another client has set the write lock on the frame, the process repeats at step 1010.

If no other client is accessing the frame, at step 1023, a read lock on the frame is set. A read lock allows any other client to read and operate on the frame but not write and change the frame. At step 1026, the client operates on the frame. At step 1028, the client requests a write lock on the frame. At step 1030, it is determined whether another client has a read or write lock on the frame. If another client has a read or write lock on the frame, the process repeats at step 1028. If no other client has a read or write lock on the frame, at step 1040, a write lock for the frame is set. At step 1050, the client sets its parameters in the frame to its destination in the network. At step 1060, the client dispatches the frame. At step 1070, the client restores the data in the frame. At step 1080, client unlocks the write lock and the process repeats at step 1000.

In one embodiment, a client initially operates on the newest frame. When a client finishes with one frame, it selects the next frame in the buffer's linked list. Thus, the client may not retrieve all of the streamed frames if it retrieves one or more frames too slowly. For example, if the buffer of a video conferencing application is full, the oldest frame not in use is discarded. If a client was accessing a frame older than the one discarded, it will not be able to view that frame.

It is acceptable in many data distribution schemes (e.g., video conferencing) for individual clients to miss frames of data due to the client's slow performance. However, the above embodiment ensures every frame of data streaming into the system is buffered so that each client has the opportunity to access each frame. Thus, while some frames may not be retrievable for individual clients, all frames are available for retrieval for some amount of time.

Figure 11:
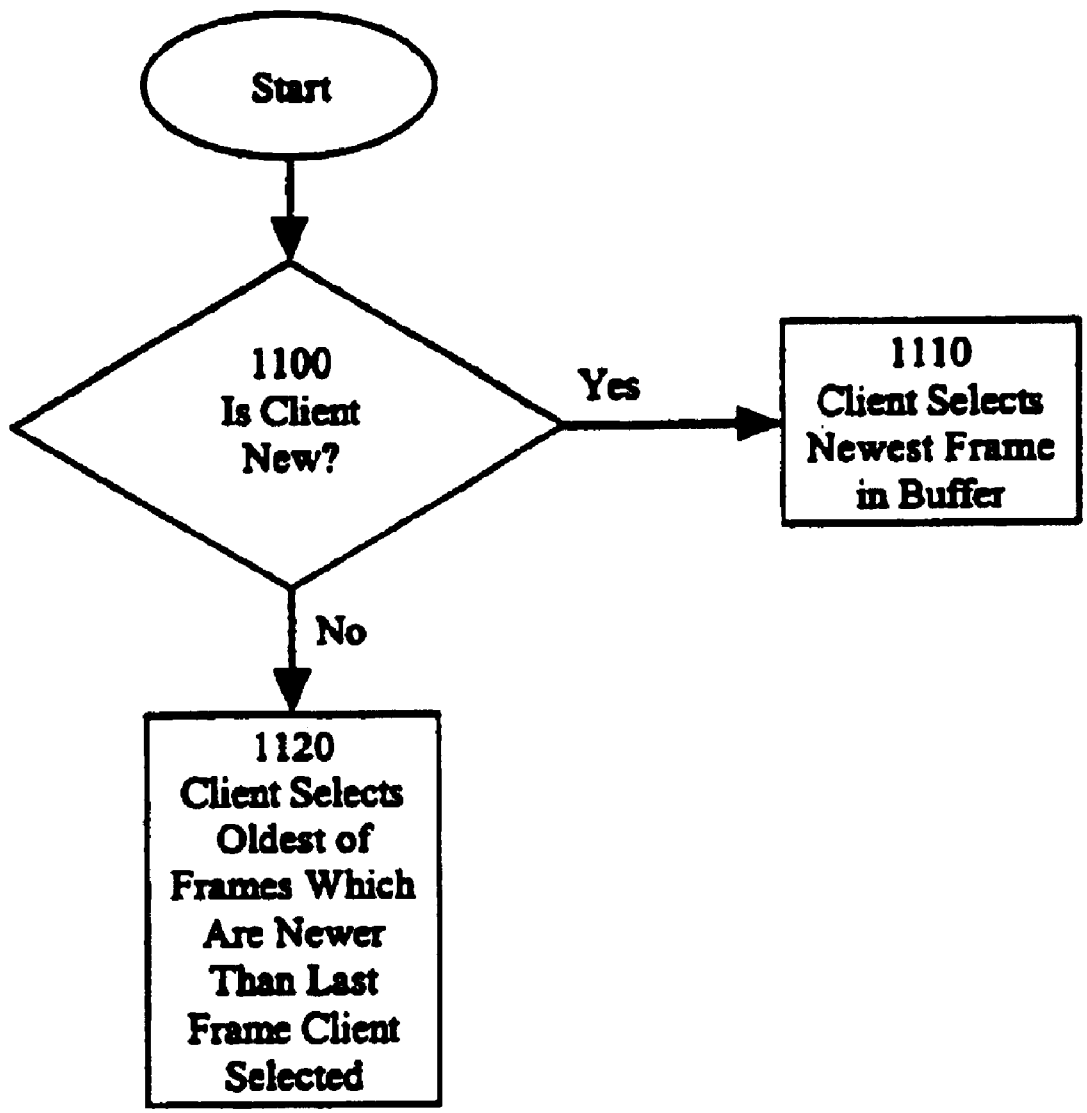
FIG. 11 is a flow diagram of a process of frame selection for retrieval in accordance with one embodiment of the present invention.

FIG. 11 illustrates the process of frame selection for retrieval in accordance with one embodiment of the present invention. At step 1100, it is determined whether the client is new. If the client is new, at step 1110, the client selects the newest frame in the buffer. If the client is not new, at step 1120, the client selects the oldest of the collection of frames which are newer than the last frame the client selected.

Virtual Desktop System Architecture

Figure 12:
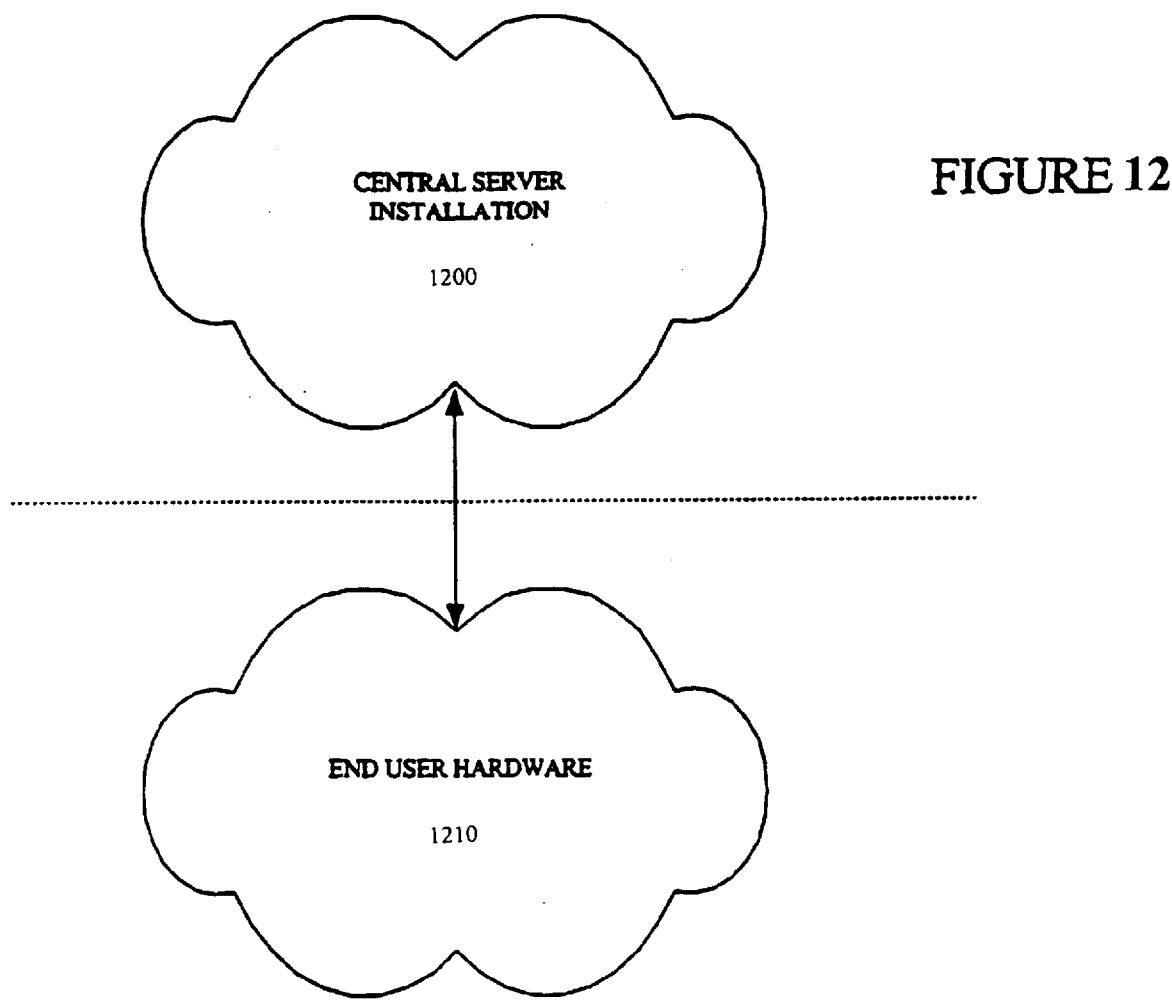
FIG. 12 is a block diagram of a thin client topology called a virtual desktop system architecture.

FIG. 12 shows an example of a thin client topology called a virtual desktop system architecture. The virtual desktop system architecture provides a re-partitioning of functionality between a central server installation 1200 and end user hardware 1210. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 13:
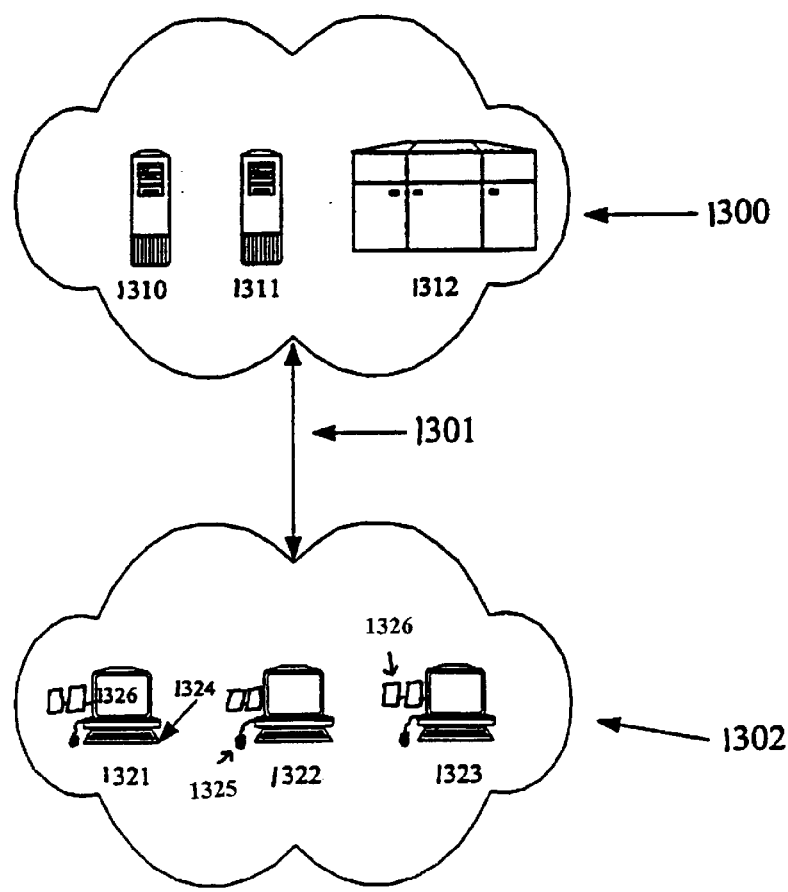
FIG. 13 is a block diagram of a virtual desktop system.

The functionality of the virtual desktop system is partitioned between a display and input device such as a remote system and associated display device, and data sources or services such as a host system interconnected to the remote system via a communication link. The display and input device is a human interface device (HID). The system is partitioned such that state and computation functions have been removed from the HID and reside on data sources or services. One or more services communicate with one or more HIDs through a communication link such as network. An example of such a system is illustrated in FIG. 13, wherein the system comprises computational service providers 1300 communicating data through communication link 1301 to HIDs 1302.

The computational power and state maintenance is provided by the service providers or services. The services are not tied to a specific computer, but may be distributed over one or more traditional desktop systems such as described in connection with FIG. 14, or with traditional servers. One computer may have one or more services, or a service may be implemented by one or more computers. The service provides computation, state and data to HIDs and the service is under the control of a common authority or manager. In FIG. 13, the services are provided by computers 1310, 1311, and 1312. In addition to the services, a central data source can provide data to the HIDs from an external source such as for example the Internet or world wide web. The data source can also broadcast entities such as those that broadcast data such as television and radio signals.

Examples of services include X11/Unix services, archived or live audio or video services, Windows NT service, Java program execution service and others. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL interface, or a variant of the java.awt.graphics class within the service producer machine. The service machine handles the translation to and from a virtual desktop architecture wire protocol described further below.

Each service is provided by a computing device optimized for its performance. For example, an Enterprise class machine could be used to provide X11/Unix service, a Sun MediaCenter could be used to provider video service, and a Hydra based NT machine could provide applet program execution services.

The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the world wide web, and others. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to completing) network traffic. Dedicated or shared communications interconnects maybe used in the present invention.

The HID is the means by which users access the computational services provided by the services. FIG. 13 illustrates HIDs 1321, 1322 and 1323. Each HID comprises a display 1326, a keyboard 1324, mouse 1325, and audio speakers 1326. The HID includes the electronics need to interface these devices to the interconnection fabric and to transmit to and receive data from the services.

Figure 14:
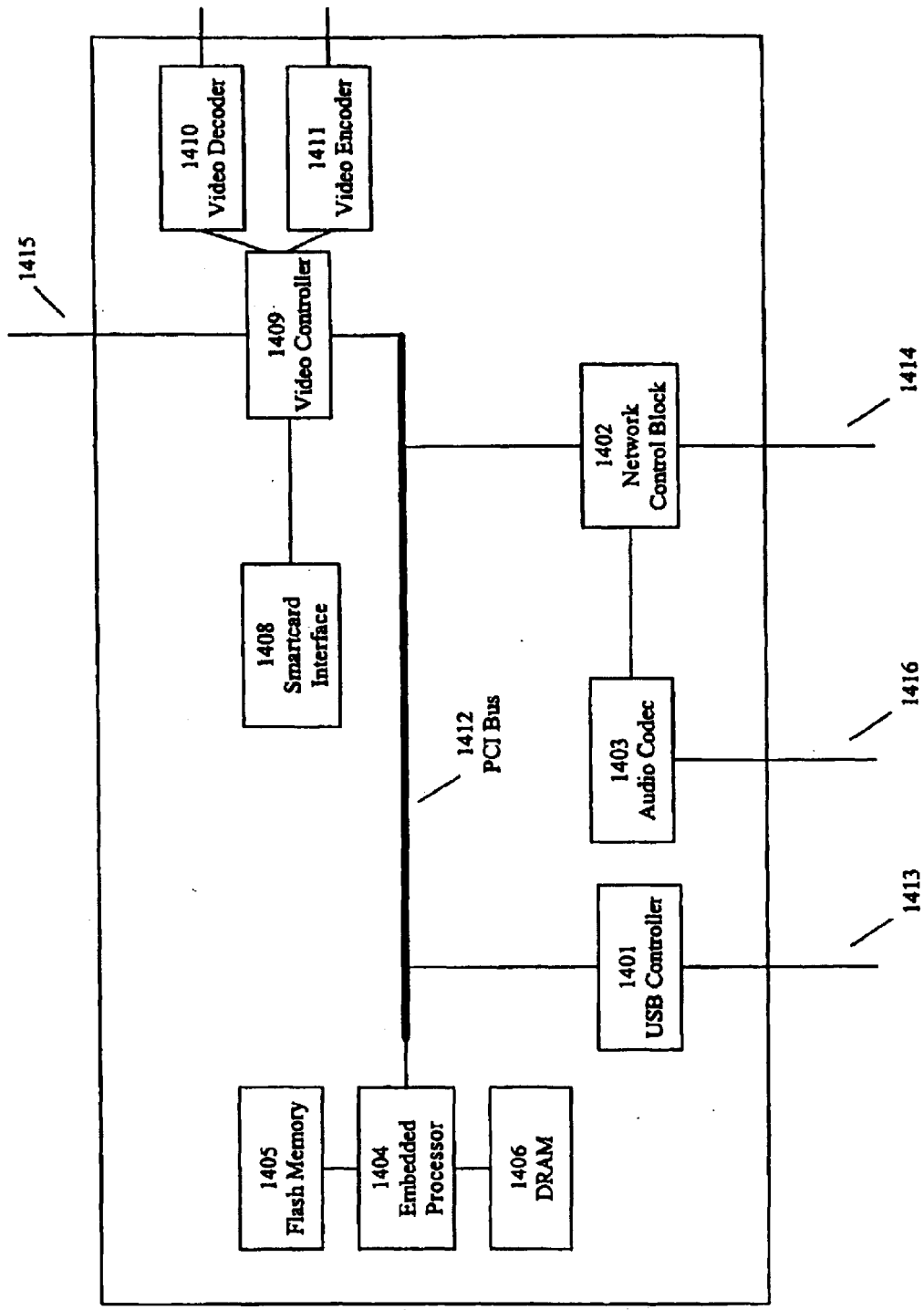
FIG. 14 is a block diagram of a human interface device.

A block diagram of an example embodiment of the HID is illustrated in FIG. 14. The components of the HID are coupled internally to a PCI bus 1412. A network control block 1402 communicates to the interconnect fabric, such as an Ethernet, through line 1414. An audio codec 1403 receives audio data on interface 1416 and is coupled to network control block 1402. USB data communication is provided on lines 1413 to a USB controller 1401. The HID further comprises an embedded processor 1404 such as a Sparc2ep with coupled flash memory 1405 and DRAM 1406. The USB controller 1401, the network controller 1402 and the embedded processor 1404 are all coupled to the PCI bus 1412. A video controller 1409, also coupled to the PCI bus 1412, can include an ATI RagePro+ frame buffer controller which provides SVGA output on the line 1415. NTSC data is provided in and out of the video controller through video decoder 1410 and encoder 1411 respectively. A smart-card interface 1408 may also be coupled to the video controller 1409.

Figure 15:
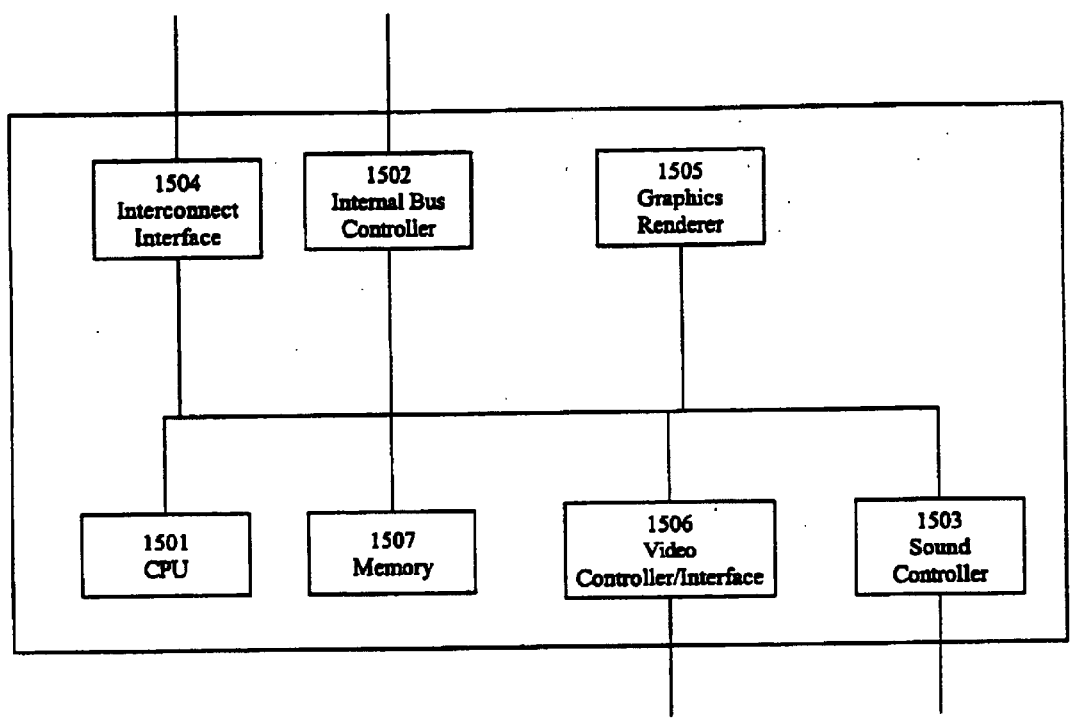
FIG. 15 is a block diagram of a human interface device.

Alternatively, the HID can comprise a single chip implementation as illustrated in FIG. 15. The single chip includes the necessary processing capability implemented via CPU 1501 and graphics renderer 1505. Chip memory 1507 is provided, along with video controller/interface 1506. An internal bus (USB) controller 1502 is provided to permit communication to a mouse, keyboard and other local devices attached to the HID. A sound controller 1503 and interconnect interface 1504 are also provided. The video interface shares memory 1507 with the CPU 1501 and graphics renderer 1505. The software used in this embodiment may reside locally in on-volatile memory or it can be loaded through the interconnection interface when the device is powered.

The operation of the virtual desktop system architecture is described in co-pending U.S. patent application Ser. No. 09/063,335, filed Apr. 20, 1998, entitled "Method and Apparatus for Providing A Virtual Desktop System Architecture" and assigned to the present assignee, and incorporated herein by reference.

Video Conferencing in Thin Client Topologies

One embodiment is used with a video conferencing application. Frames consist of video or audio data packets.

One embodiment is used in a thin client topology. In this embodiment, the thin clients send display requirements (e.g., position and clipping information) to the buffer. Before a video frame is dispatched to a client, it is locked and the client's screen specific translation parameters are applied. After a video frame is dispatched to a client, the data is restored to its original state and unlocked.

Figure 16:
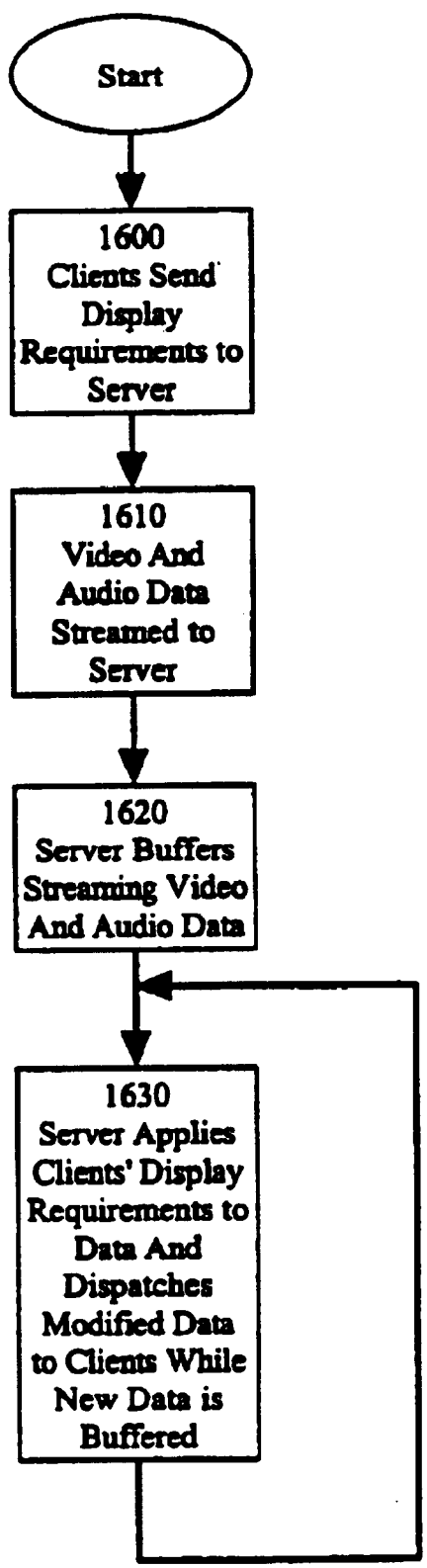
FIG. 16 is a flow diagram of video conferencing in a thin client topology in accordance with one embodiment of the present invention.

FIG. 16 illustrates video conferencing in a thin client topology in accordance with one embodiment of the present invention. At step 1600, clients send display requirements to a server. At step 1610, video and audio data are streamed to the server. At step 1620, the server buffers the streaming video and audio data. At step 1630, the server applies the clients display requirements to the data and dispatches the modified data to the clients while new data is buffered. The process repeats at step 1630.

Embodiment of Computer Execution Environment
(Hardware)

Figure 17:
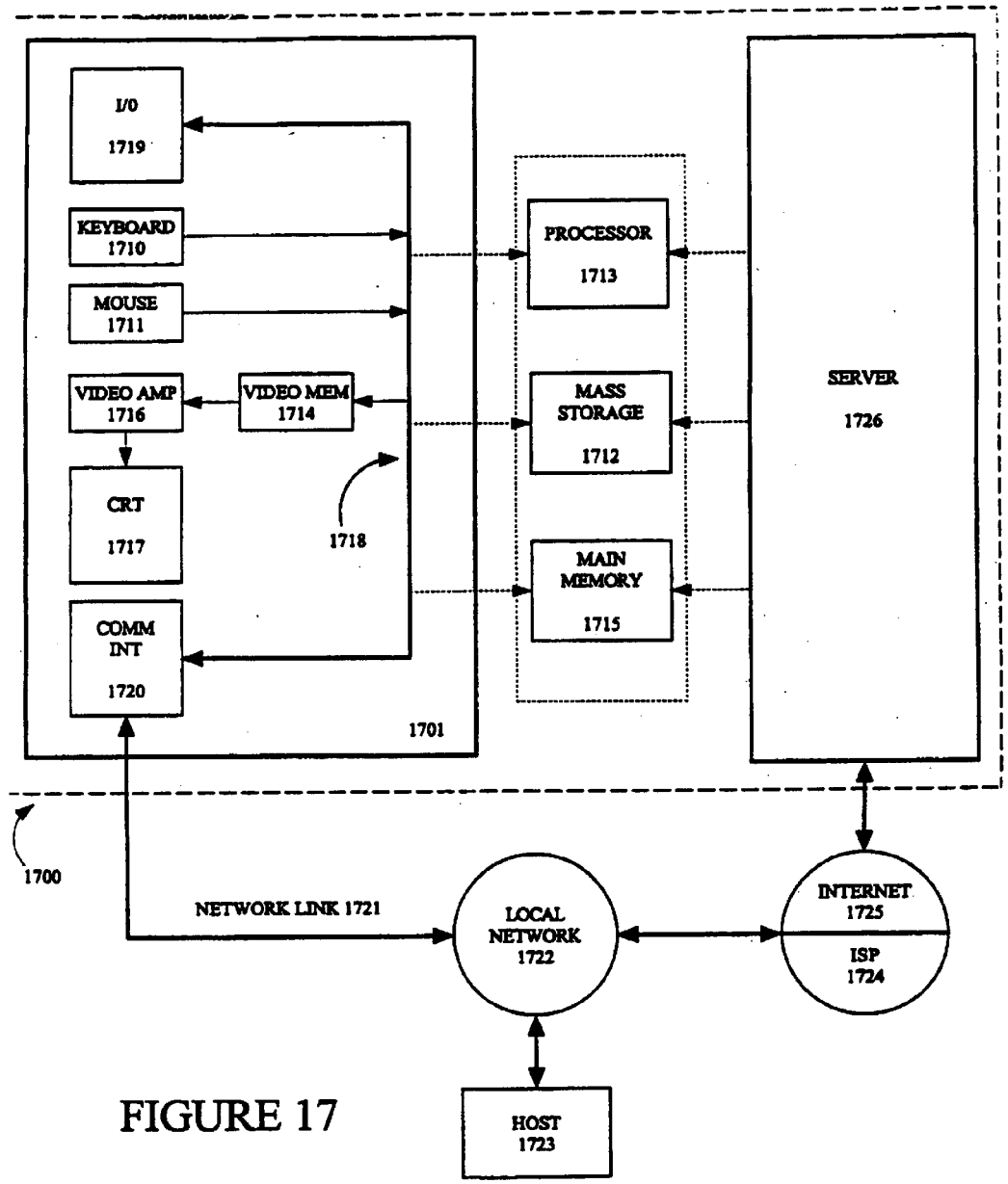
FIG. 17 is a block diagram of a general purpose computer.

An embodiment of the invention can be implemented as computer software in the form of computer readable program code executed in a general purpose computing environment such as environment 1700 illustrated in FIG. 17, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1710 and mouse 1711 are coupled to a system bus 1718. The keyboard and mouse are for introducing user input to the computer system and communicating that user input to central processing unit (CPU) 1713. Other suitable input devices may be used in addition to, or in place of, the mouse 1711 and keyboard 1710. I/O (input/output) unit 1719 coupled to bidirectional system bus 1718 represents such I/O elements as a printer, ANV (audio/video) I/O, etc.

Computer 1701 may include a communication interface 1720 coupled to bus 1718. Communication interface 1720 provides a two-way data communication coupling via a network link 1721 to a local network 1722. For example, if communication interface 1720 is an integrated services digital network (ISDN) card or a modem, communication interface 1720 provides a data communication connection to the corresponding type of telephone line, which comprises part of network link 1721. If communication interface 1720 is a local area network (LAN) card, communication interface 1720 provides a data communication connection via network link 1721 to a compatible LAN. Wireless links are also possible. In any such implementation, communication interface 1720 sends and receives electrical, electromagnetic or optical signals which carry digital data streams representing various types of information.

Network link 1721 typically provides data communication through one or more networks to other data devices. For example, network link 1721 may provide a connection through local network 1722 to local server computer 1723 or to data equipment operated by ISP 1724. ISP 1724 in turn provides data communication services through the world wide packet data communication network now commonly referred to as the "Internet" 1725. Local network 1722 and Internet 1725 both use electrical, electromagnetic or optical signals which carry digital data streams. The signals through the various networks and the signals on network link 1721 and through communication interface 1720, which carry the digital data to and from computer 1700, are exemplary forms of carrier waves transporting the information.

Processor 1713 may reside wholly on client computer 1701 or wholly on server 1726 or processor 1713 may have its computational power distributed between computer 1701 and server 1726. Server 1726 symbolically is represented in FIG. 17 as one unit, but server 1726 can also be distributed between multiple "tiers". In one embodiment, server 1726 comprises a middle and back tier where application logic executes in the middle tier and persistent data is obtained in the back tier. In the case where processor 1713 resides wholly on server 1726, the results of the computations performed by processor 1713 are transmitted to computer 1701 via Internet 1725, Internet Service Provider (ISP) 1724, local network 1722 and communication interface 1720. In this way, computer 1701 is able to display the results of the computation to a user in the form of output.

Computer 1701 includes a video memory 1714, main memory 1715 and mass storage 1712, all coupled to bi-directional system bus 1718 along with keyboard 1710, mouse 1711 and processor 1713. As with processor 1713, in various computing environments, main memory 1715 and mass storage 1712, can reside wholly on server 1726 or computer 1701, or they may be distributed between the two. Examples of systems where processor 1713, main memory 1715, and mass storage 1712 are distributed between computer 1701 and server 1726 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 1712 may include both fixed and removable media, such as magnetic, optical or magnetic optical storage systems or any other available mass storage technology. Bus 1718 may contain, for example, thirty-two address lines for addressing video memory 1714 or main memory 1715. The system bus 1718 also includes, for example, a 32-bit data bus for transferring data between and among the components, such as processor 1713, main memory 1715, video memory 1714 and mass storage 1712. Alternatively, multiplex data/address lines may be used instead of separate data and address lines.

In one embodiment of the invention, the processor 1713 is a SPARC microprocessor from Sun Microsystems, Inc., a microprocessor manufactured by Motorola, such as the 680X0 processor, or a microprocessor manufactured by Intel, such as the 80X86 or Pentium processor. However, any other suitable microprocessor or microcomputer may be utilized. Main memory 1715 is comprised of dynamic random access memory (DRAM). Video memory 1714 is a dual-ported video random access memory. One port of the video memory 1714 is coupled to video amplifier 1716. The video amplifier 1716 is used to drive the cathode ray tube (CRT) raster monitor 1717. Video amplifier 1716 is well known in the art and may be implemented by any suitable apparatus. This circuitry converts pixel data stored in video memory 1714 to a raster signal suitable for use by monitor 1717. Monitor 1717 is a type of monitor suitable for displaying graphic images.

Computer 1701 can send messages and receive data, including program code, through the network(s), network link 1721, and communication interface 1720. In the Internet example, remote server computer 1726 might transmit a requested code for an application program through Internet 1725, ISP 1724, local network 1722 and communication interface 1720. The received code may be executed by processor 1713 as it is received, and/or stored in mass storage 1712, or other non-volatile storage for later execution. In this manner, computer 1700 may obtain application code in the form of a carrier wave. Alternatively, remote server computer 1726 may execute applications using processor 1713, and utilize mass storage 1712, and/or video memory 1715. The results of the execution at server 1726 are then transmitted through Internet 1725, ISP 1724, local network 1722 and communication interface 1720. In this example, computer 1701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for buffering in multi-node data distribution architectures is described in conjunction with one or more specific embodiments. The invention is defined by the following claims and their full scope an equivalents.

What is claimed is:

1. A method for buffering in a multi-node data distribution architecture comprising:
   providing one or more storage items;
   allocating one or more storage blocks:
   storing said data items in said storage blocks; and
   dispatching said data items to one or more clients;
   wherein said step of dispatching comprises:
       selecting a first storage block wherein said storage block stores a newest data item.

2. The method of claim 1 wherein said step of allocating comprises:
   determining a minimum number of storage blocks;
   determining an additional number of storage blocks such that said additional number is equal to a first number of said clients; and
   allocating a second number of storage blocks such that said second number is equal to said minimum number plus said additional number.

3. The method of claim 1 wherein said step of storing comprises:
   collecting a set of said data items; and
   storing said set in at least one of said storage blocks.

4. The method of claim 1 wherein said step of storing comprises:
   finding at least one of said storage blocks such that said at least one of said storage blocks is empty; and
   storing a first data item in said at least one of said storage blocks.

5. The method of claim 1 wherein said step of storing comprises:
   identifying a set of said storage blocks wherein said storage blocks are not currently accessed by said clients;
   selecting a second storage block wherein said second storage block is a member of said set; and
   emptying said second storage block.

6. The method of claim 5 wherein said step of selecting comprises:
   determining an oldest data item wherein said oldest data item is stored in said seconds storage block.

7. The method of claim 1 wherein said step of storing comprises:
   storing said data items in a linked list.

8. The method of claim 1 wherein said step of dispatching comprises:
   allowing a plurality of clients to access at least one of said storage blocks simultaneously.

9. The method of claim 8 wherein said step of dispatching further comprises:
   indicating said at least one of said storage blocks is in use.

10. The method of claim 3 wherein said step dispatching comprises:
    locking said at least one of said storage blocks for a first client;
    performing zero or more operations on said set;
    sending said set to said first client;
    restoring said set; and
    unlocking said at least one of said storage blocks.

11. The method of claim 1 wherein said step of dispatching comprises:
    selecting a second storage block wherein a next oldest data item is stored in said second storage block.

12. The method of claim 1 wherein said data items are one or more video data items.

13. The method of claim 1 wherein said multi-node data distribution architecture is a thin client topology.

14. A buffer for a multi-node data distribution architecture comprising:
    one or more data items;
    an allocation device configured to allocate one or more storage blocks;
    a storage device configured to store said data items in said storage blocks; and
    a dispatching device configured to dispatch said data items to one or more clients;
    wherein said dispatching device is further configured to select a first storage block wherein said storage block stores a newest data item.

15. The buffer of claim 14 wherein said allocation device comprises:
    a first determiner configured to determine a minimum number of storage blocks;
    a second determiner configured to determine an additional number of storage blocks such that said additional number is equal to a first number of said clients; and
    a first allocation device configured to allocate a second number of storage blocks such that said second number is equal to said minimum number plus said additional number.

16. The buffer of claim 14 wherein said storage device comprises:
    a data collector configured to collect a set of said data items; and
    a first storage device configured to store said set in at least one of said storage blocks.

17. The buffer of claim 14 wherein said storage device comprises:
    a location device configured to locate at least one of said storage blocks such that said at least one of said storage blocks is empty; and a first storage unit configured to store a first data item in said at least one of said storage blocks.

18. The buffer of claim 14 wherein said storage device comprises:
    an identifier configured to identify a set of said storage blocks wherein said storage blocks are not currently accessed by said clients;
    a selection unit configured to select a second storage block wherein said second storage block is a member of said set; and
    a deletion unit configured to empty said second storage block.

19. The buffer of claim 14 wherein said selection unit is further configured to determine an oldest data item wherein said oldest data item is stored in said second storage block.

20. The buffer of claim 14 wherein said storage device is further configured to store said data items in a linked list.

21. The buffer of claim 14 wherein said dispatching device is further configured to allow a plurality of clients to access at least one of said storage blocks simultaneously.

22. The buffer of claim 21 wherein said dispatching device is further configured to indicate said at least one of said storage blocks is in use.

23. The buffer of claim 16 wherein said dispatching device comprises:
    a locking device configured to lock said at least one of said storage blocks for a first client;
    a calculator configured to perform zero or more operations on said set;
    a first dispatching device configured to send said set to said first client;
    a restoring device configured to restore said set; and
    an unlocking device configured to unlock said at least one of said storage blocks.

24. The buffer of claim 14 wherein said dispatching device is further configured to select a second storage block wherein a next oldest data item is stored in said second storage block.

25. The buffer of claim 14 wherein said data items are one or more video data items.

26. The buffer of claim 14 wherein said multi-node data distribution architecture is a thin client topology.

27. A computer program product comprising:
    a computer usable medium having computer readable program code embodied therein configured for buffering in a multi-node data distribution architecture, comprising:
        computer readable code configured to cause a computer to collect one or more data items;
        computer readable code configured to cause a computer to allocate one or more storage blocks:
        computer readable code configured to cause a computer to store said data items in said storage blocks; and
        computer readable code configured to cause a computer to dispatch said data items to one or more clients;
        wherein said computer readable code configured to cause a computer to dispatch comprises:
            computer readable code configured to cause a computer to select a first storage block wherein said storage block stores a newest data item.

28. The computer program product of claim 27 wherein said computer readable code configured to cause a computer to allocate comprises:
    computer readable code configured to cause a computer to determine a minimum number of storage blocks;
    computer readable code configured to cause a computer to determine an additional number of storage blocks such that said additional number is equal to a first number of said clients; and
    computer readable code configured to cause a computer to allocate a second number of storage blocks such that said number is equal to said minimum number plus said additional number.

29. The computer program product of claim 27 wherein said computer readable code configured to cause a computer to store comprises:
    computer readable code configured to cause a computer to collect a set of said data items; and
    computer readable code configured to cause a computer to store said set in at least one of said storage blocks.

30. The computer program product of claim 27 wherein said computer readable code configured to cause a computer to store comprises:
    computer readable code configured to cause a computer to locate at least one of said storage blocks such that said at least one of said storage blocks is empty; and
    computer readable code configured to cause a computer to store a first data item in said at least one of said storage blocks.

31. The computer program product of claim 27 wherein said computer readable code configured to cause a computer to store comprises:
    computer readable code configured to cause a computer to identify a set of said storage blocks wherein said storage blocks are not currently accessed by said clients;
    computer readable code configured to cause a computer to select a second storage block wherein said second storage block is a member of said set; and
    computer readable code configured to cause a computer to empty said second storage block.

32. The computer program product of claim 31 wherein said computer readable code configured to cause a computer to select comprises:
    computer readable code configured to cause a computer to determine an oldest data item wherein said oldest data item is stored in said second storage block.

33. The computer program product of claim 27 wherein said computer readable code configured to cause a computer to store comprises:
    computer readable code configured to cause a computer to store said data items in a linked list.

34. The computer program product of claim 27 wherein said computer readable code configured to cause a computer to dispatch comprises:
    computer readable code configured to cause a computer to allow a plurality of clients to access at least one of said storage blocks simultaneously.

35. The computer program product of claim 34 wherein said computer readable code configured to cause a computer to dispatch further comprises:
    computer readable code configured to cause a computer to indicate said at least one of said storage blocks is in use.

36. The computer program product of claim 29 wherein said computer readable code configured to cause a computer to dispatch comprises:
    computer readable code configured to cause a computer to lock said at least one of said storage blocks for a first client;
    computer readable code configured to cause a computer to perform zero or more operations on said set;

computer readable code configured to cause a computer to send said set to said first client;

computer readable code configured to cause a computer to restore said set; and computer readable code configured to cause a computer to unlock said at least one of said storage blocks.

37. The computer program product of claim 27 wherein said computer readable code configured to cause a computer to dispatch comprises:

computer readable code configured to cause a computer to select a second storage block wherein a next oldest data item is stored in said second storage block.

38. The computer program product of claim 27 wherein said data items are one or more video data items.

39. The computer program product of claim 27 wherein said multi-node data distribution architecture is a thin client topology.

* * * * *